UNITED STATES PATENT OFFICE.

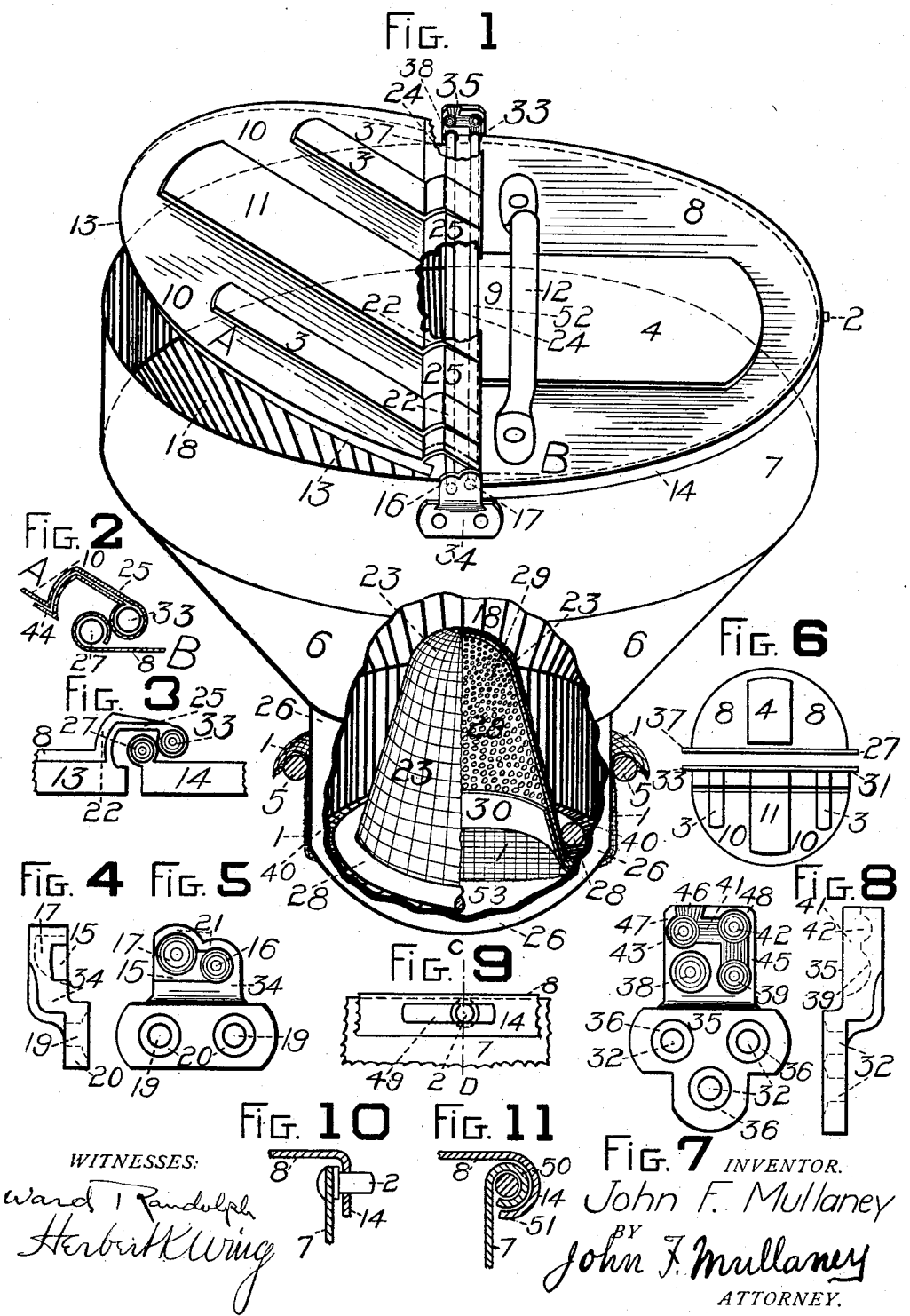

JOHN F. MULLANEY, OF COLORADO SPRINGS, COLORADO.

RECEPTACLE-COVER.

1,213,400.   Specification of Letters Patent.   Patented Jan. 23, 1917.

Application filed April 20, 1911. Serial No. 622,255.

*To all whom it may concern:*

Be it known that I, JOHN F. MULLANEY, a citizen of the United States, residing at 741 East Cache-la-Poudre street, in Colorado Springs, in the county of El Paso, in the State of Colorado, have invented certain new and useful Improvements in Receptacle-Covers, of which the following is a specification.

My improvements relate to a sanitary removable cover in two parts pivoted on lugs attached to the receptacle for which the cover may be applicable, by means of lugs of peculiar construction attached to opposite sides of the receptacle, near its opening; and the objects of my invention are to provide a dirt, rain and insect-proof protecting lid, suitable for all receptacles requiring same, and in two pieces and easily detachable from its respective receptacle. I attain these objects by means of the mechanism and appliances illustrated in the accompanying drawing, in which:—

Figure 1, is a perspective of a strainer with the removable cover attached and the lid partly open and the lower part of the bowl and part of the nose of the receptacle cut away to show the construction of the apparatus within: Fig. 2, is a section on the line A—B of Fig. 1: Fig. 3, is a detail of the approximate connection of the hinged lid 10, and the removable cover 8: Fig. 4, is an edge elevation of the hinge lug 34: Fig. 5, is an inside elevation of the hinge lug 34: Fig. 6, is an outside top view of the removable cover 8, and the hinged lid 10, separately exposed: Fig. 7, is an inside elevation of the hinge lug 35: Fig. 8 is an edge elevation of the hinge lug 35: Fig. 9, is an elevation of part of the strainer around the retaining lug 2: Fig. 10, is a section of Fig. 9 on the line C—D: Fig. 11, is a section on the line C—D, omitting the retaining lug 2, and substituting therefor the rolled out top 50, and omitting the slot 49, and substituting therefor the hook flange 51.

Similar numerals and letters, referred to similar parts throughout the drawings and the several views.

The hinged lugs 34, and 35, carrying the removable cover 8, and the hinged lid 10, in combination with the top of the receptacle, form the principal part of my invention.

It is often the practice to place a milk strainer on the top of a can or other receiving tank in the room or yard where the milking is being done, or in places where the milk is exposed to objectional conditions, where the opening in the top of the strainer would expose the interior and the contents to rain, dust, bad air, foreign matter, flies or other insects, that might get into the strainer or other receptacle and contaminate the contents. I obviate these obnoxious difficulties by means of a removable and sanitary cover 8, and hinged lid 10, shown in Fig. 1, and Fig. 6.

The removable cover 8, as shown in Fig. 1, has a rib edge 24, with a rod extending through it and projecting about ⅜ of an inch at either end, as shown at 27, and 37, in Fig. 6. This rib edge 24, rises its full thickness above the level of the tin or metal disk of the removable cover 8, so that dust or water or other foreign matter might alight upon the top of the removable cover but could not pass up over the rib edge 24, and get into the interior 18, of the strainer receptacle. In placing the removable cover 8, upon the top of the strainer receptacle or other receptacle the rod end 37, is first inserted into the top recess 38, of the large hinge lug 35, shown in Fig. 7, and Fig. 1, and then the rod end 27, is forced into the slotted way 15, until it reaches recess 16, in the small hinge lug 34, shown in Fig. 5, and Fig. 1.

In the stiffening down flange 14, as shown in Fig. 9, is slot 49, made to receive the end of the retaining lug 2, which is rigidly attached at one end to, and projecting outwardly from, near the top of the outer curved surface of the upright wall 7, of the strainer receptacle, in such a manner that while forcing the rod end 27, of the cover 8, into the slotted way 15, the retaining lug 2, passes through the slot 49, and thus retains the curved edge of the removable cover 8, from being lifted up from the top of the upright wall 7, of the strainer or receptacle. Thus it is obvious that unless the rod end 27, is removed back out of the slotted way 15, the removable cover 8, will remain rigidly attached to the top of the receptacle, and the operator, by taking hold of the lifting handle 12, might raise not only the removable cover but with it the whole receptacle and its contents.

The danger of the removable cover 8, slipping off by means of disengagement of the rod end 27, from the small hinge lug 34, is obviated by placing the hinged lid 10 in place. This is done by first inserting the pivot end 31, of the hinged lid 10, into the top recess 17, of the small hinge lug 34, as shown in Fig. 5, and in Fig. 1, which would obstruct the removal of rod end 27, as shown in Fig. 2, and Fig. 3. The then free end of hinged lid 10, which is pivot end 33, is placed down through the entrance 46, and through the serpentine slotted way 41, to the shallow recess 39, of the large hinge lug 35, as shown in Fig. 7, and Fig. 1. This completely locks the removable cover 8, within the proper recesses in the lugs 34, and 35, and allows the hinged lid 10, a pivotal motion on its pivot ends 31, and 33, in lugs 34, and 35, respectively. The end 37, does not pivot into the recess 38, of receiving lug 35, but tapers into a wedge shaped vertical edge fitting into a fitting recess making its action non-torsional. The same condition applies on the other end 27, of this rod, which has a horizontal edge fitting into the horizontal groove 16, in receiving lug 34, and has only a sliding horizontal and not pivotal motion. The object being in both of these ends 37, and 27, and their respective recesses 38, and 16, to prevent a rolling action of said ends, to prevent the lifting of the curved edge of the removable cover 8, which would obviate the need of the retaining lug 2. But I retain said lug 2, to avoid a violent torsional strain on the said ends 37, and 27.

To open the hinged lid 10, the operator may take hold of the stiffening down flange 13, with his hand, or may shove it up with the edge of a milk bucket, or by other means, as high as he desires it to be raised or till it tilts back against the front side of the lifting handle 12, where it will usually remain of its own gravitation, its top and center of gravity, being beyond its pivotal point 31, and 33. The removable cover 8, and hinged lid 10, are provided with a stiffening down flange 13, and 14, respectively which not only serve the purpose of stiffening the respective cover and lid, and maintains for them a rigid normal shape, but also acts to prevent the ingress of insects, dust or other obnoxious substances into the interior 18, of the strainer receptacle.

The hinged lid 10, like the removable cover 8, is provided at its straight edge, where it is pivoted, with a rod 52, projecting downward about ⅜ of an inch as shown at its respective ends 31, and 33, which rod projects from the curved top and arch 25, of the lid 10, downward, instead of upward as does the rod 24, and thus forms a lock mechanism to rod end 27, by the pivot end 23, intercepting it, as shown in Fig. 2, and Fig. 3. The sheet metal forming the disk of the removable cover 8, passes beneath the rod in forming the rib edge 24, then passes upward and back over the rod as shown in Fig. 2, and is to be soldered at its edges and ends to the top of the removable cover 8. The sheet metal of the hinged lid 10, passes back over the top of the rod 52, terminating in the pivot end 31, and 33, and then down and then up in front of the rod 52, then forward under the arch 2, of the lid 10, forming the doubled-in-under part 44, of lid 10, and is soldered to the underside of lid 10, at its edges. This doubled-in-under part is especially for stiffening purposes of arch 25, which is not protected by the stiffening down flange 13, in that part.

One of the objects in having the pivot ends 31, and 33, back of the ribbed edge 24, is to lock the removable cover 8, within and to the hinge lugs 34, and 35, and another object is to have the hinged lid 10, to overlap the removable cover 8, so that debris or other obnoxious material, falling upon the removable cover or hinged lid 10, will be prevented from getting down into the interior 18, by being thrown back upon the removable cover 8, when the hinged lid 10, is raised to admit the liquid to be strained, and at other times.

One of the objects in having the removable cover 8, and the hinged lid 10, of the receptacle, removable, is to more easily cleanse it, and keep it in a sanitary condition, and to have more easy access into the interior 18, of the receptacle.

The removable cover 8, is shown in Fig. 1, and Fig. 6, provided with a stiffening rib crimp 4, which is provided to assist in retaining the rigidity and the normal shape of the removable cover 8. The hinged lid 10, as shown in Fig. 1, and Fig. 6, is provided with two small stiffening crimps 3, and 5, and the central stiffening crimp 11, which crimps are to be pressed upward of the plane of the disk in the hinged lid, and which crimps are to extend up over the arch 25, as shown in Fig. 3, and diminished at the top and back of the arch 25, as shown in Fig. 3. These three stiffening crimps are provided to maintnain the rigidity of the two thicknesses of the sheet metal in arch 25, and the hinged lid 10, of the milk strainer or other receptacle upon which this lid may be used.

When it is desired to raise the hinged lid 10, by catching the underside of the stiffening down flange 13, with the upper front edge of a bucket or other liquid or material containing vessel and raising thereby the said hinged lid 10, then for such purposes the central stiffening crimp 11, thereof is high enough to allow the escape of the liquid or other substance to be poured from the pail or bucket, without engaging the underside of the concave surface of said central stiffening crimp 11.

To prevent the accidental disengagement of the pivot end 33, from the hinge lug 35, I have provided the serpentine slotted way 41, which acts as a sort of combination of checks restricting the accidental disengagement and necessitating a multiplicity of varied motion, to-wit: directly upward against the retaining flange 48, where the pivot end 33, would again be checked by the slight intermediate depression 42, of large hinge lug 34, as shown in Fig. 7, where to form an escape it would be required that it again move downward and horizontally to be lifted out of the slight intermediate depression 42, through the more complex and horizontal part of the slotted way 41, at the same time and would likely enter the slight depression 43, where it would be retained by coming into contact, with the friction part at its end on the entrance 46, to the serpentine slotted way.

It is intended to utilize the spring of the elasticity of the upright wall 7, of the receptacle to assist in retaining the rod end 5, in place within the shallow recesses 16, of small hinge lug 34, and to assist in retaining pivot end 33, in the shallow recess 39, of large hinge lug 35. The said hinge lugs 34, and 35, are so formed as to be curved out away from the upright wall 7, of the strainer bowl or other receptacle upon which the removable cover and hinged lid are to be used, so as to allow room for a roll or rib top edge around said upright wall 7, and to allow space for the stiffening down flanges 13, and 14.

In Fig. 10, is illustrated the manner in which the stiffening down flange 14, of the removable cover 8, is secured by means of a retaining lug 2, to the upright wall 7. This Fig. 10, is a section of Fig. 9, on the line C—D, leaving the retaining lug 2, entire.

In Fig. 11, is shown the form of the stiffening down flange 14, curved over the rolled-out top edge of the upright wall 7, when the same is rolled out to form a stiffening rib and in which case, I omit the use of the retaining lug 2, the rolled out top edge 50, serving the purpose of the retaining lug 2, and the hooked-in flange 51, at the bottom edge of the stiffening down flange 14, serves the purpose of the slot 49, in the stiffening down flange 14.

In Fig. 2, is shown a section of the arch 25, on the line A—B of the Fig. 1, illustrating the form in which the sheet metal, in the removable cover 8, and the hinged lid 10, is to be bent to form said parts. The free edge, as therein shown, in arched part, is to be soldered upon the principal sheet to prevent unsanitary conditions, and to make a strong and more efficient appliance. The two rods indicated at 27, and 33, in Fig. 8, may be rigidly soldered to their respective sheet metal parts where they come into contact at the point of their entrance thereof, to prevent a sliding motion thereon and to produce a sanitary and practical utensil.

The lifting handle 12, is rigidly secured by rivets and solder or otherwise to the top of the removable cover 8, near to the pivotal point of the hinged lid 10, and of suitable material, and of sufficient strength to lift the receptacle and its contents, if so desired.

The removable cover 8, and the hinged lid 10, are to be made of suitable metal and sufficiently heavy to warrant the parts retaining their natural shape, when submitted to be piled one upon the other in aggregation to be washed, steamed or cleaned.

The hinge lugs 34, and 35, are constructed as shown, in the illustration and provided to be secured to the outer wall of the receptacle by means of rivets, passing from the inside of the receptacle interior 18, outward through provided holes in the upright wall 7, and through respective holes 19, 19, and 32, 32, 32, of the respective hinged lugs and to be riveted and in the case of the milk strainer, the edge of the seam of contact may be soldered, to provide an additional condition of sanitation and rigidity of construction. In the illustration I have shown a provision in the annular depressions 36, around the respective holes, in the hinge lug 35, and depressions 20, in the hinge lug 34, whereby the middle of the upright wall 7, may be somewhat depressed on the inner surface by the shortening or tightening of the rivets or the bolts to be used and yet to maintain an elastic condition, by reason of the annular depressions about the holes. This is more clearly illustrated by the dotted lines in Fig. 4, and Fig. 8. In Fig. 7, and Fig. 8, is shown a detail of the large hinge lug 35, on a scale approximating its normal size. It will be noticed it projects farther above the edge of the receptacle than does the other hinge lug, and this extension is often utilized by the one handling the bowl in cleansing it, and at other times when the removable cover 8, is detached as a handle. To add additional strength to its fastenings, I have added a down projection and the additional third rivet on the down projection for the purpose of rigidity, strength and efficiency and where required I provide a down-projecting strengthening lug on each of the lugs.

In some instances the removable cover 8, may be used on a strainer or receptacle without using the hinged lid 10, and will be sufficient fastening of the lifting handle 12, to the receptacle to enable the operator to carry the receptacle or lift it and its contents by the said lifting handle 12.

In other instances when the strainer is used only and no cover is required as in straining cream or fruit juices or gasolene, a common wire bail engaging the lugs 34 and 35, may be used to handle and remove the strainer from place to place as required by the operator. The compression caused by the spring of the receptacle forces the rod ends 27, and 37, into the recesses 16, and 38, respectively, and also forces the pivot ends 31, and 33, into the recesses 17, and 39, respectively and securely locks them there for temporary purposes.

I am aware that prior to this invention receptacles have been used having covers and hinged lids. I therefore do not claim such a combination broadly, but

I claim:—

1. In a receptacle, the combination of a cover having a bearing having two oppositely projecting ends and a hinge lug secured to the edge of the receptacle and having its inner face flanges provided with a groove extending laterally from the rear to the front of the lug and terminating in a slight recess adapted to receive and hold one of the ends of said bearings of the removable cover, and a hinge lug secured to the opposite side of said receptacle and having a deep recess on its inner face adapted to receive and hold the opposite end of said bearing, substantially as set forth.

2. In a receptacle, the combination of a two-part cover, the top part having a bearing having two oppositely projecting ends, a hinge securing lug secured to the side of the receptacle and having a groove, extending laterally from rear to front on its inner or secured side and terminating in a slight recess adapted to receive and hold one end of the bearing of the said top part, a hinge lug secured to the opposite side of the receptacle and having a deep recess on the inner secured side thereof adapted to receive and hold the opposite end of the bearing of the said top part, substantially as set forth.

3. In a receptacle, a cover provided with a bearing having two oppositely projecting ends, a hinge lug, secured to the side of the receptacle near its open top and having a grooved way extending laterally from its rear edge to near its front edge on its inner or secured side and terminating in an enlarged slight recess, adapted to receive and hold one end of the bearing of the cover, a hinge lug secured to the opposite side of said receptacle and having a deep recess on the inner or secured side thereof adapted to receive and hold the opposite end of said cover bearing, substantially as set forth.

4. In a receptacle, having a removable hinged lid, a hinge lug secured to the outer side of the receptacle near its open top and having a grooved way, extending laterally from its rear top edge on its inner or secured side and terminating in a slight recess, adapted to receive and hold one of the cover bearing ends, a hinge lug secured to the opposite side of said receptacle at the same relative height as the former hinge lug and having a deep recess on the inner or secured side thereof near its front edge and opposite the slight recess adapted to receive and hold the opposite bearing end of said cover, said first-named lug being provided with a deep recess between the slight recess and the entrance to the said grooved way, a projecting pivotal bearing for said hinged lid one end of which is pivoted in said deep recess, a slight depression in said last named hinge lug and opposite the said last named deep recess adapted to receive and hold the opposite end of the pivotal bearing, substantially as set forth.

5. In combination with a receptacle, a removable cover therefor provided with a bearing having oppositely projecting ends, a hinge securing lug secured to the side of the receptacle near its top and having a slotted way, there being a deep groove extending from its rear edge to near its front edge and terminating in a slight depression or recess adapted to receive one end of the bearing of the said removable cover of the receptacle, a hinge securing lug secured to the opposite edge of the receptacle, from the first named hinge securing lug, and having a deep recess near its front edge and opposite the said slight recess in said first named hinge securing lug adapted to receive the opposite end of the bearing, a hinged cover having a bearing provided with two projecting bearings pivoted in said hinge securing lugs, a deep recess in the first named hinge lug at the entrance to said slotted way adapted to receive one end of the pivotal bearing of the said hinged cover, said last named hinge receiving lug having a crooked groove way terminating in a shallow recess adapted to receive and hold the opposite end of the pivotal bearing of the said hinged lid by the spring of the receptacle, substantially as set forth.

6. In combination with a receptacle a three place attaching removable half cover and a two bearing hinged lid, a hinge securing lug secured to the top edge of the receptacle and having a slight depression and a groove extending laterally therefrom to receive one of the bearings of the removable half-cover, a hinge securing lug secured to the opposite edge of the receptacle, from the said first named hinge securing lug, and having a deep recess near its front edge adapted to receive the other bearing of the said removable half cover, an upwardly projecting tubular rib integral with said hinged lid extending laterally across its straight edge near the middle of the mouth of the receptacle, a rod extending through said rib and projecting at both ends and said rib extending upwardly above the plane of the disk of said removable half cover, adapted to enter the said slight recess, and the said deep recess, respectively, a downwardly projecting stiffening flange from the curved edge of said half cover, the said flange being provided with a longitudinally extending slot, a lug projecting horizontally from the outer top edge of said receptacle and adapted to be received by said slot, substantially as set forth.

7. In combination with a receptacle a hinged lid and a removable half cover, hinge lugs secured rigidly to opposite sides of a receptacle near its top edge, the removable half cover having a rib extending along its straight edge near the middle of the mouth of the receptacle, projecting above the plane of the disk of said half cover and integral therewith, a rod extending through said rib and terminating in projecting ends adapted to engage seating recesses in said hinge lugs, a downwardly projecting stiffening flange extending from the curved edge of said half cover provided with a longitudinally extending slot in said downwardly extending stiffening flange adapted to receive a lug rigidly attached to the outer edge of said strainer or other receptacle and adapted to hold down the curved edge of said removable half cover, said hinged lid being provided at its straight edge with a downwardly projecting rib containing a stiffening rod projecting at each end to engage seating recesses in the said hinge lugs respectively, said lid having an upwardly projecting arch extending along its straight edge adapted to receive the upwardly projecting rib on the straight edge of said removable half cover, substantially as set forth.

8. In combination with an open top receptacle a removable two-part cover, comprising the combination of a disk covering a part of the said open top and having along its straight edge near the center of the open top a raised rib, a pivoted lid covering the rest of the opening and extending back over the said raised rib, lugs attached to the receptacle near its upper edge, projecting lugs extending longitudinally from the straight edges of said disk, and said lid, and adapted to detachably engage said hinge lugs, the inner faces of said hinge lugs having recesses adapted to detachably receive the said projecting lugs from the said disk and the said lid and retain them by means of the spring of the receptacle, and means for detachably securing the curved edge of said disk to the top of said receptacle, substantially as set forth.

9. In combination with a receptacle, a two-part cover, the top part over-lapping the other, downwardly projecting flanges from the outer edge of each part of the cover adapted to inclose the outer wall of the receptacle, the flange on the under part of the cover having a recess adapted to receive a lug projecting from the said receptacle, each part of the cover being provided with oppositely projecting bearing lugs, with two upwardly projecting hinge lugs secured to the upper edge of the receptacle and each having two recesses adapted to receive the oppositely projecting bearing lugs, a lug integral with the receptacle and projecting outwardly from its top edge and midway of said hinge lugs and adapted to engage the said recess in said flange, substantially as set forth.

10. In combination with a receptacle, a pair of securing lugs adapted to be secured nearly opposite each other to the receptacle and to project beyond its edge, the inner face of the first receiving lug being provided with a groove ending in a slight retaining recess and having a deep pivot recess near the entrance of said groove adapted to receive bearings of a two-piece closing appliance for the opening of said receptacle, the face of the second of said pair of receiving lugs being provided with a deep retaining recess adapted to receive bearings on said closing appliance and located opposite the bearings to be received by said first named lug and to hold said bearings in said recess by means of the spring of the body of the receptacle, substantially as set forth and for the purposes specified.

JOHN F. MULLANEY. [L. S.]

Witnesses:
H. K. WING,
EFFIE COOK.

Copies of this patent may be obtained for five cents each, by addressing the "Commissioner of Patents, Washington, D. C."